UNITED STATES PATENT OFFICE.

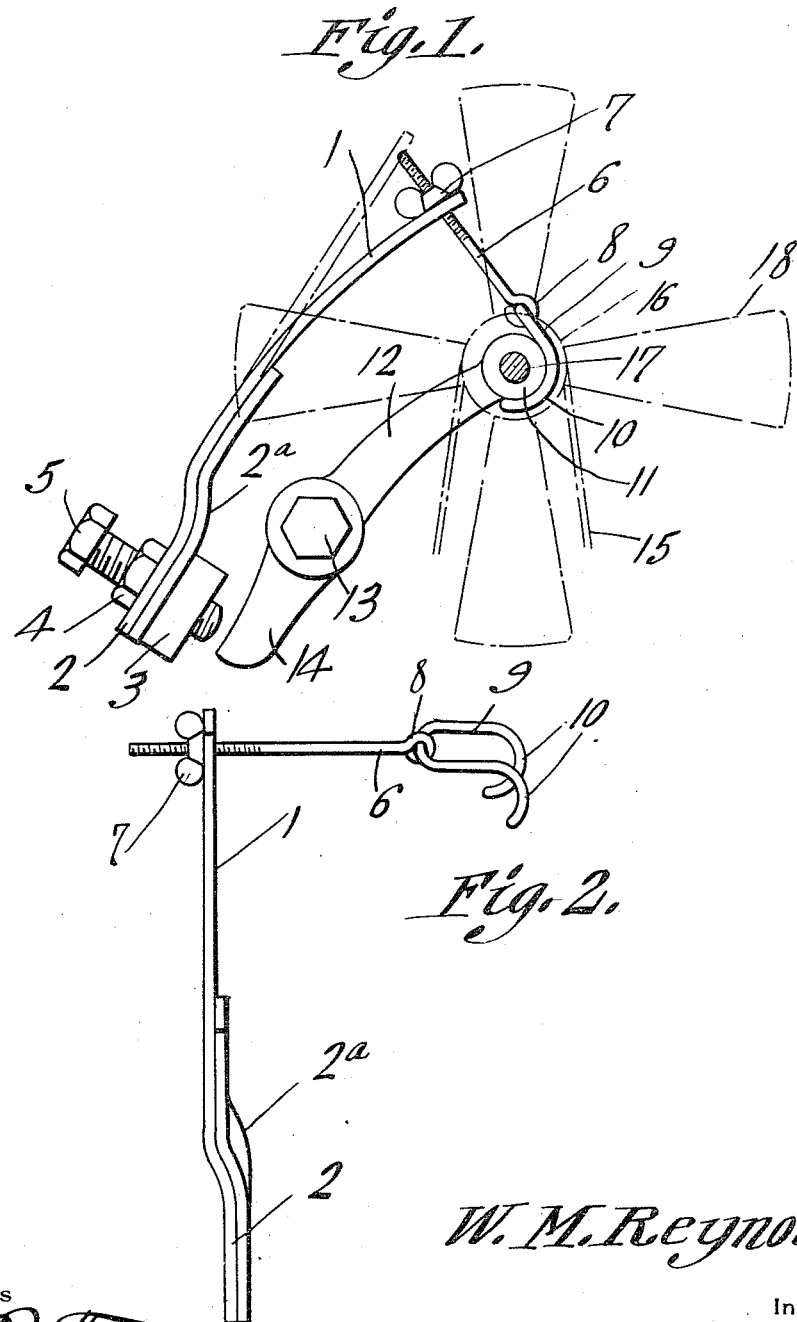

WALTER M. REYNOLDS, OF HATTIESBURG, MISSISSIPPI.

AUTOMOBILE-FAN-BELT TIGHTENER.

1,266,318.     Specification of Letters Patent.     Patented May 14, 1918.

Application filed August 31, 1917. Serial No. 189,194.

*To all whom it may concern:*

Be it known that I, WALTER M. REYNOLDS, a citizen of the United States, residing at Hattiesburg, in the county of Forest and State of Mississippi, have invented a new and useful Automobile-Fan-Belt Tightener, of which the following is a specification.

This invention relates to a fan belt tightener designed especially for attachment to a Ford or similar automobile for tightening the fan belt in a simple yet efficient manner, the device being inexpensively manufactured, conveniently applied, and being of improved construction to enhance its utility.

The invention is illustrated in the accompanying drawing, wherein:

Figure 1 is a front view of the device as applied, portions being shown in dot and dash lines.

Fig. 2 is a perspective view of the device.

The device embodies a leaf spring 1 formed from a resilient bar or strip, and having an offset basal end 2 provided with a reinforcing piece 2ª clamped snugly to the adjusting screw lug 3 of the engine by the lock nut 4 of the adjusting screw 5 which is threaded through said lug. A bolt or rod 6 extends slidably through said spring near its free end, and has a wing or thumb nut 7 threaded thereon and bearing against said spring. Said rod is provided with an eye 8 pivotally embracing the bend of a U-shaped attaching member or double hook 9, the terminals of which are bent into hooks 10 to engage and partially embrace the bearing 11 of the fan bracket or arm 12 which is pivotally supported, as at 13, near the lug 3. This bracket has the extension 14 which is usually engaged by the screw 5 to tighten the belt, but which is inefficient since no means is thereby provided to take up loose play when the belt stretches. With the present device, when it is applied and the nut 7 tightened, this forces the spring 1 toward the bracket 12, and said spring will therefore tend to move away from the bracket, thereby urging the bracket with it. This will hold the belt 15 taut, which extends over the pulley wheel 16 on the shaft 17 journaled in the bearing 11 and carrying the fan 18. The member 9 provides effective means for adjusting the device to the fan bracket, there being a flexible connection between the rod 6 and member 9, which is desirable.

Having thus described the invention, what is claimed as new is:

1. A belt tightener embodying a leaf spring, a rod extending slidably therethrough, means carried by the rod for connection with a belt bracket, means upon the rod bearing against the spring for bringing it under tension, and means for supporting the spring.

2. A belt tightener embodying a leaf spring, a rod extending slidably therethrough, an attaching member connected loosely with the rod and engageable with the bearing of a belt bracket, a nut threaded on said rod and bearing against said spring to bring it under tension, and means for supporting the spring.

3. A belt tightener embodying a U-shaped member having hooks at its terminals to engage a belt bracket, a rod connected loosely to the bend of said member, spring means connected to the rod, and a support for the spring means.

4. A belt tightener embodying a U-shaped member having hooks at its terminals to engage a belt bracket, a rod connected loosely to the bend of said member, a leaf spring through which a rod is slidable, means upon the rod bearing against the spring to bring the latter under tension, and means for supporting the spring.

In testimony that I claim the foregoing as my own, I have hereto affixed my signature in the presence of two witnesses.

WALTER M. REYNOLDS.

Witnesses:
N. T. HAMMET,
G. T. STAFFORD.

Copies of this patent may be obtained for five cents each, by addressing the "Commissioner of Patents, Washington, D. C."